(12) United States Patent
Ene et al.

(10) Patent No.: US 12,002,026 B2
(45) Date of Patent: Jun. 4, 2024

(54) METHOD FOR CONTEXT-BASED SELECTION AND ACTIVATION OF APPLICATIONS ON A MOBILE DEVICE

(71) Applicant: LaterPay AG, Steinhausen (CH)

(72) Inventors: Cosmin-Gabriel Ene, Munich (DE); Martin Hans, Bad Salzdetfurth (DE)

(73) Assignee: SUPERTAB AG (DE)

( * ) Notice: Subject to any disclaimer, the term of this patent is extended or adjusted under 35 U.S.C. 154(b) by 856 days.

(21) Appl. No.: 16/960,243

(22) PCT Filed: Jan. 4, 2019

(86) PCT No.: PCT/EP2019/050184
§ 371 (c)(1),
(2) Date: Jul. 6, 2020

(87) PCT Pub. No.: WO2019/134980
PCT Pub. Date: Jul. 11, 2019

(65) Prior Publication Data
US 2021/0065147 A1    Mar. 4, 2021

Related U.S. Application Data

(60) Provisional application No. 62/613,972, filed on Jan. 5, 2018.

(51) Int. Cl.
*G06Q 20/14*   (2012.01)
*G06Q 20/24*   (2012.01)
(Continued)

(52) U.S. Cl.
CPC ............. *G06Q 20/14* (2013.01); *G06Q 20/24* (2013.01); *G06Q 50/18* (2013.01); *G06Q 2220/18* (2013.01); *H04W 4/12* (2013.01)

(58) Field of Classification Search
CPC ........ G06Q 20/14; G06Q 20/24; G06Q 50/18; G06Q 2220/18; H04W 4/12
(Continued)

(56) References Cited

U.S. PATENT DOCUMENTS 8,498,939 B1 *   7/2013   Gupta ................ G06Q 30/0637
                                                705/40
9,147,187 B1 *   9/2015   Gailloux ................ G06Q 20/36
(Continued)

FOREIGN PATENT DOCUMENTS

KR    20120076633 A  *  7/2012  ............. G06F 21/35

*Primary Examiner* — Courtney P Jones

(57) ABSTRACT

A method for accessing an application on a mobile device in the absence of a network connection to a provider of the application, including the steps of presenting an identifier of the application at a user interface of the mobile device when a condition has been satisfied, receiving an input at the user interface requesting access to the application, presenting a license agreement at the user interface specifying a license fee, receiving another input at the user interface indicating user acceptance of the license agreement and fee, executing a pre-settlement action by the mobile device with reference to the license fee, storing information of the license agreement and fee-pre-settlement in the memory of the mobile device, and activating the application for access by the user subject to the license agreement. The condition to be satisfied is determined from a context analysis of actions by or conditions of the mobile device.

26 Claims, 5 Drawing Sheets

(51) Int. Cl.
*G06Q 50/18* (2012.01)
*H04W 4/12* (2009.01)

(58) Field of Classification Search
USPC .......................................................... 705/59
See application file for complete search history.

(56) References Cited

U.S. PATENT DOCUMENTS

| | | | |
|---|---|---|---|
| 2007/0238450 A1* | 10/2007 | Hogberg | H04M 1/72448 455/418 |
| 2011/0178896 A1* | 7/2011 | Nakajima | G06Q 30/0607 705/26.25 |
| 2011/0225658 A1* | 9/2011 | Khosravy | G06Q 50/18 726/28 |
| 2011/0307354 A1* | 12/2011 | Erman | G06F 8/60 705/26.7 |
| 2012/0110317 A1* | 5/2012 | Scheer | G06F 21/10 726/28 |
| 2014/0032350 A1* | 1/2014 | Biswas | G06Q 30/018 709/219 |
| 2014/0164225 A1* | 6/2014 | Cardona | G06Q 20/223 705/39 |
| 2018/0213377 A1* | 7/2018 | Lau | H04W 4/029 |
| 2021/0042722 A1* | 2/2021 | Wolter | G06Q 20/202 |

* cited by examiner

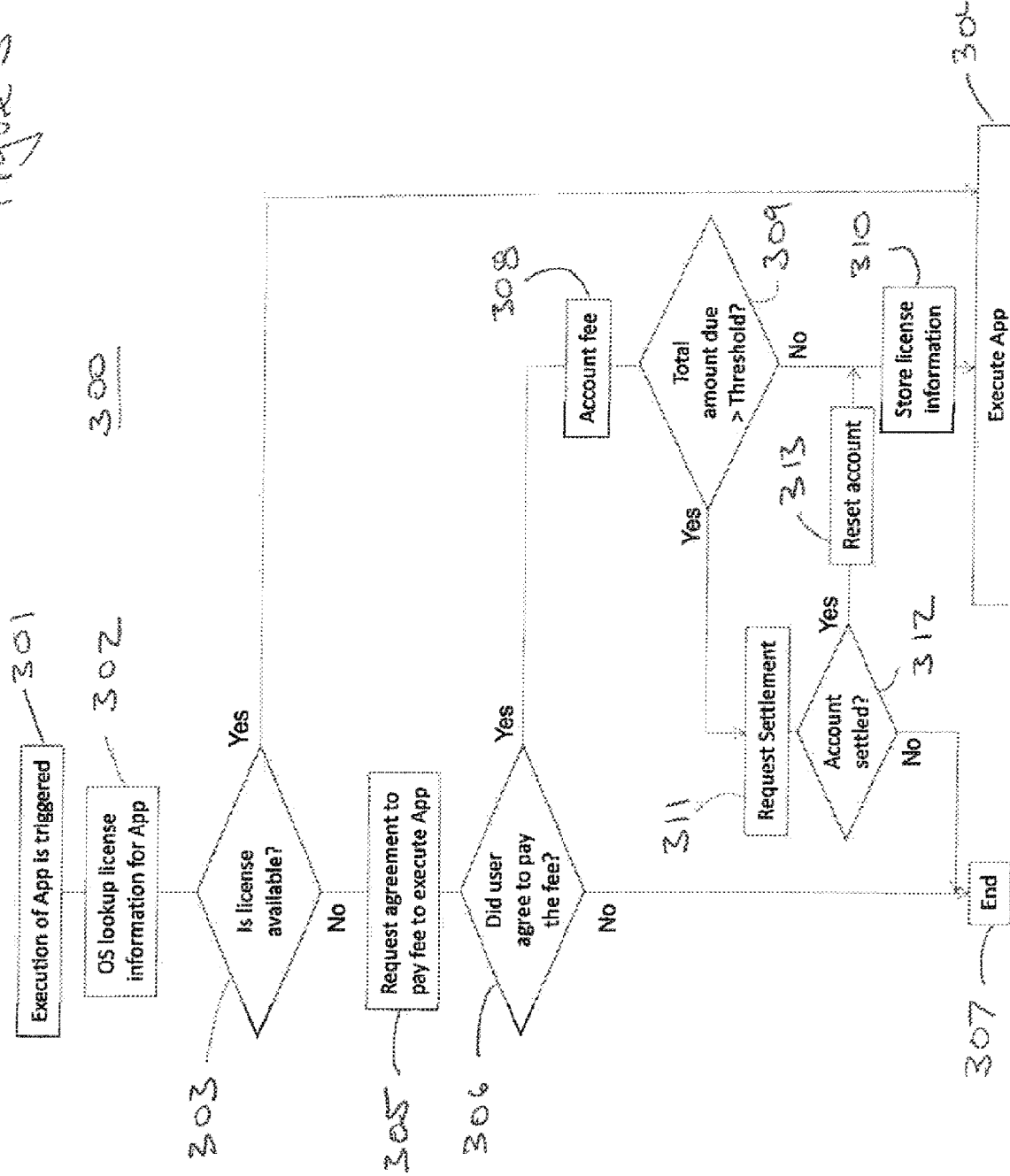

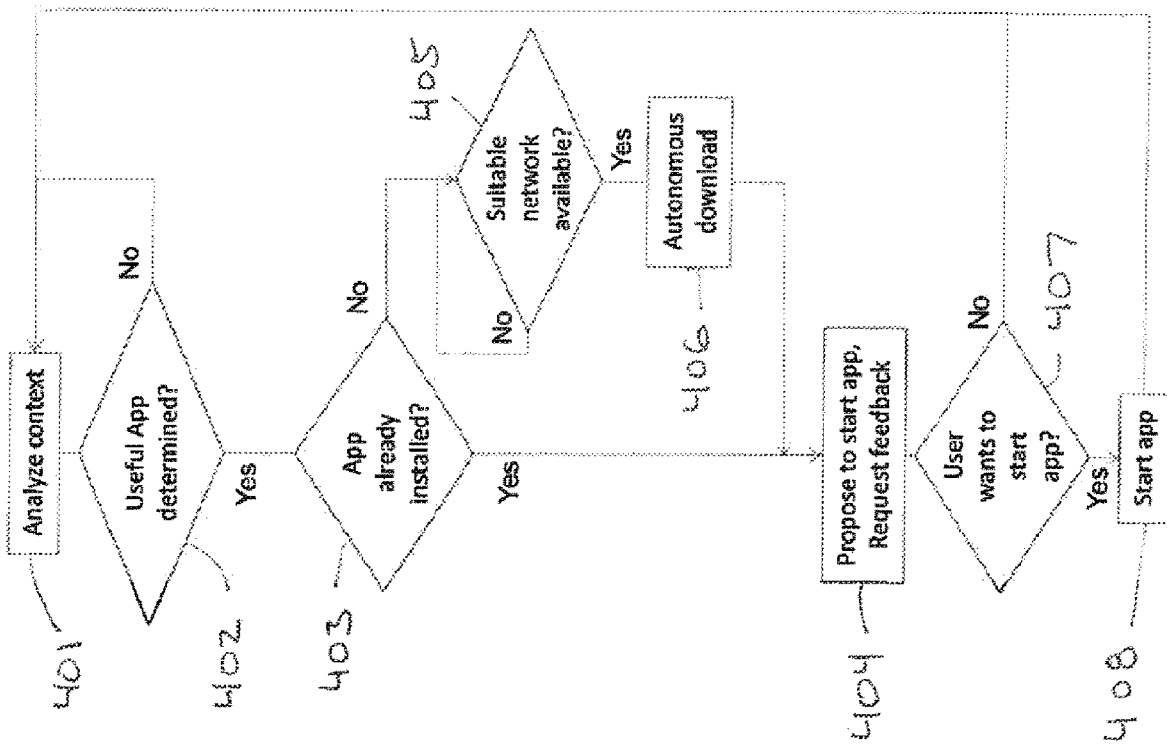

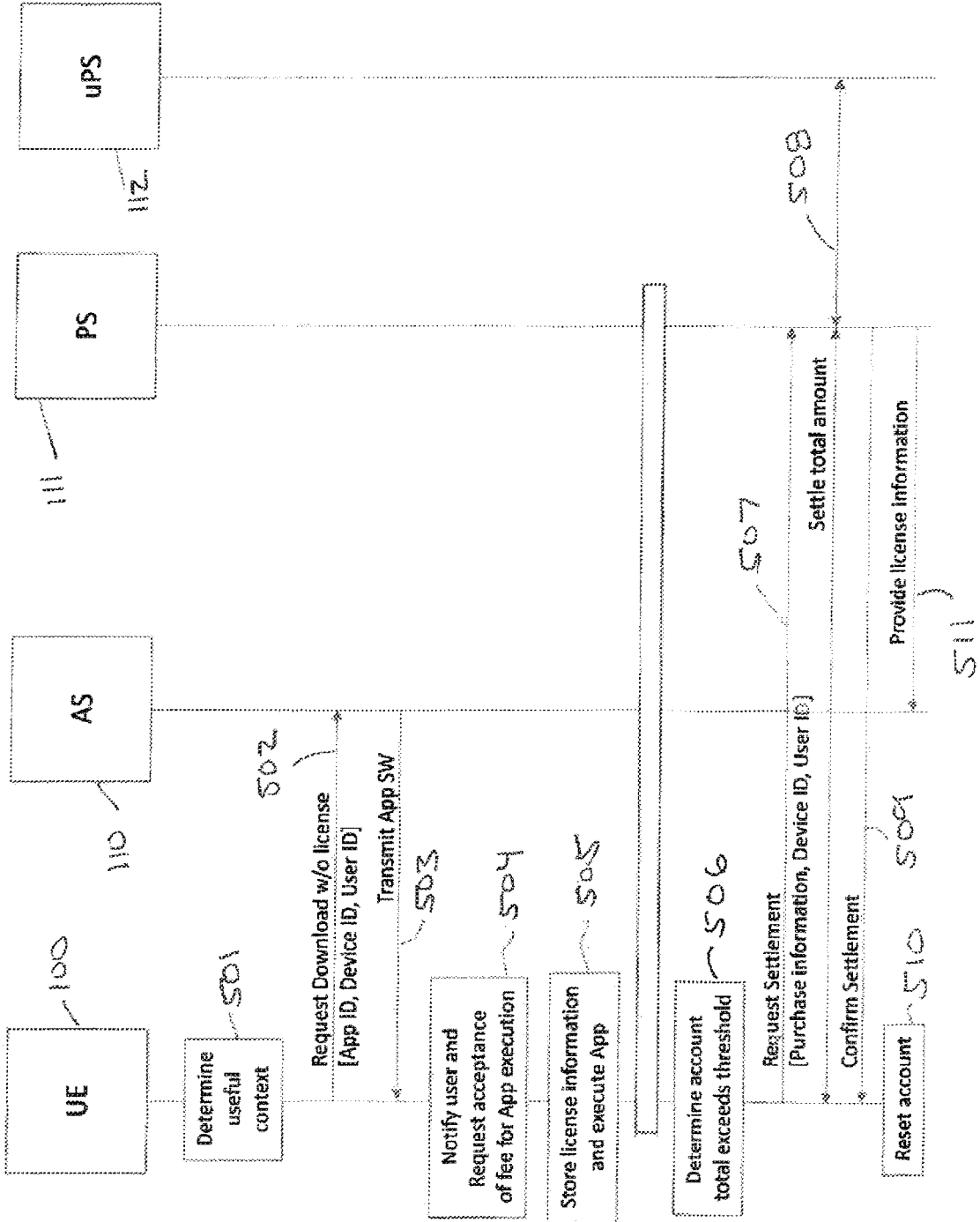

METHOD FOR CONTEXT-BASED SELECTION AND ACTIVATION OF APPLICATIONS ON A MOBILE DEVICE

CROSS-REFERENCE TO RELATED APPLICATIONS

This application is a National Stage Application of PCT/EP2019/050184 filed Jan. 4, 2019, which claims priority from U.S. Provisional Patent Application No. 62/613,972, filed on Jan. 5, 2018. The priority of both said PCT and U.S. Provisional Patent Application are claimed. Each of the prior mentioned applications is hereby incorporated by reference herein in its entirety.

FIELD OF THE INVENTION

This disclosure pertains to methods for activating applications on a mobile device, and more particularly, to methods for providing applications on a mobile device based on a contextual analysis and methods for activating an application on a mobile device upon completing a pre-settlement action with reference to a license fee of the application.

BACKGROUND

For online shopping, various possibilities exist to pay for physical goods. Online shops often request new users to register with their real name and email address. During the shopping process, the mail address for shipping non-digital goods and credit card information is typically requested before a purchase is finally accepted by the online shop. For digital goods like audio or video media data, the process is very much the same, with the email address substituted for the mailing address. Payments are most often affected in real-time by credit card. Alternatives may include transfers from other on-line bank accounts and bitcoins, the worldwide virtual currency.

There are payment systems established that offer a payment service to shops and customers that have benefits over the procedures described above. For example, one system requires buyers to register at a payment service that is trusted by customers. Thereafter, these services require only an email address, for example, to be provided to the online shop at that time of purchase. The shop then requests settlement of a bill from the payment service and based on the mail address and the customer's registration the payment service communicates with the customer and finalizes the purchase, finally providing the registered shipping address to the online shop.

These and other payment services have in common that they require both an agreement to pay and a payment to be made before the purchase is actually finalized. For digital goods, the credit card is debited or the payment service transfers the purchase amount to the online shop before the digital data is delivered to the customer.

An exception to this basic mechanism is described for example in U.S. Patent Publication No. 2012/0166339 A1 to Ene, published Jun. 28, 2012 and entitled "Payment System, Purchasing System, and Method for Performing a Plurality of Payment Processes," which is hereby incorporated by reference in its entirety herein. This publication describes a payment system and methods for a plurality of associated payment processes. The system and methods are invoked for a buyer system making a purchase in an online shop for a certain purchase amount. The system stores an identification number of the buyer system, stores the purchase amount in relation to the identification number, receives a request from the online shop to account for the purchase amount, and sends a request for settlement of at least a part of the total amount of purchases to a user of the buyer system only when the total amount of purchases exceeds a predefined value and/or after the expiry of a predefined time interval.

Simplified, this publication describes a system that allows a buyer to make purchases online with a buyer system for a purchase amount which the buyer initially does not have to settle. The payment system accumulates the amounts of purchases from the buyer system so long as the cumulative amount does not exceed a predefined value. Once the total exceeds the predefined value, the buyer is requested to settle either the total amount due or at least part of this amount. The buyer system in this case can be implemented on a PC, a mobile phone or the like. The purchases and purchase amounts are stored by the payment system in relation to a buyer system identifier, which preferably does not reveal a personal identifier of the buyer. It requires no registration or any other user interaction.

U.S. Patent Publication No. 2002/0022472 A1 to Watler et al., published on Feb. 21, 2002 and entitled "Multiple Virtual Wallets in Wireless Device," is hereby incorporated by reference in its entirety herein. This publication describes accounting systems on mobile phones that account financially for network resource usage up to a pre-defined maximum amount stored. If the total amount accounted for exceeds the pre-defined maximum, some systems may request authorization for a higher total amount from another authority, or disable at least some device functions. An option may be added that allows for multiple accounts on the device, and thereby accounts for specific services in accordance with dedicated accounts held on the phone.

U.S. Patent Publication No. 2006/0105811 A1 to Chen, published on May 18, 2006 and entitled "Mobile Communicator," is hereby incorporated by reference in its entirety herein. This publication describes methods for calculation of call expenses performed on the mobile device based on Charge Advice Information (CAI). The CAI is stored in a memory of the device or SIM card. The total expense is compared to a preset maximum amount stored on the phone. Use of the phone is prevented when the total amount exceeds the preset maximum. An automated reset according to a billing cycle can reset the accumulated amount so that accounting restarts after payment has been made.

As one type of a mobile device, smartphones have been in use for at least a decade. These devices include an operating system (OS) that supports a multitude of functions that are carried out by software applications (apps) installed on the smartphone. Each app offers a more or less rich set of operations using the hardware and software component of the phone.

As provided to a user, smartphones have some pre-installed apps which immediately work when activated by the user of the smartphone. Other apps can usually be downloaded by a user from Internet-based providers (so-called "App Stores") just prior to use, either for free or for a fee. Some apps offer only limited functions for free, and require that additional features to enhance the functionality be purchased (so-called "in-app purchases").

Both Internet-based app purchases and in-app purchases require a user of the mobile device that wishes to obtain and use a new app or new features for the first time to acquire a connection to the Internet in order to access a respective App Store, to login (manually or automatically by the OS) to the App Store, to agree to the license terms, to pay the license fee, and to receive confirmation from the app store at the mobile device before proceeding to use the new app or new app features.

SUMMARY

By way of example, aspects of the present disclosure are directed to a method for providing accessibility of an application on a mobile device to a user in the absence of a network connection facilitating communications between the mobile device and a provider of the application.

For purposes of clarity in the present disclosure, the possibility or right of a user to start or execute a specific software application or to use a specific feature is pursuant a license for the application or feature. When a fee has to by paid to use an app that is already downloaded and/or installed on the phone but that is not usable without paying or agreeing to pay a fee, the payment or payment arrangement effectively represents a purchase of a license for the already-downloaded application or app. This is in contrast to the conventional practice of buying or purchasing an app at the time of downloading so that, once downloaded and installed, the application can be started and/or executed.

In accordance with aspects of the present disclosure, the disclosed method includes the steps of: a) determining by the mobile device whether a condition has been satisfied, b) presenting an identifier of the application at a user interface of the mobile device when the condition has been satisfied, c) receiving a first input at the user interface requesting access to the application, d) presenting a license agreement at the user interface, the license agreement specifying a license fee, e) receiving a second input at the user interface indicating user acceptance of the license agreement and fee, f) executing a pre-settlement action by the mobile device with reference to the license fee, g) storing information of the license agreement and fee-pre-settlement in the memory of the mobile device, and g) activating the application for access by the user subject to the license agreement.

In accordance with an additional aspect of the disclosure, the step of determining by the mobile device whether a condition has been satisfied includes performing a context analysis.

In accordance with further aspects of the disclosure, the step of executing the pre-settlement action by the mobile device includes the steps of: a) determining that the license fee is less than a predetermined, non-zero threshold amount qualifying for deferred payment by a payment system, and b) recording the license fee in a ledger entry for the payment system in a secure memory of the mobile device by a wallet application of the mobile device. Alternatively, the step of executing the pre-settlement action by the mobile device may include the steps of: a) determining that the license fee is greater than a predetermined, non-zero threshold amount, and b) transmitting a settlement request for the license fee over a network to a payment system by the mobile device.

In accordance with additional aspects of the disclosure, a method is disclosed for selecting an application to be presented to a use of the mobile device. This method includes the steps of: a) performing a context analysis by the mobile device to identify at least one application stored in a non-executable form in a memory of the mobile device, b) presenting an identifier of the at least one application at a user interface of the mobile device, c) receiving a first input at the user interface requesting access to the at least one application, d) presenting at least one license agreement at the user interface, the at least one license agreement specifying at least one license fee, e) receiving a second input at the user interface indicating user acceptance of the at least one license agreement and fee, f) processing the stored at least one application stored in the memory to produce an executable form of the at least one application, and g) activating the at least one application for use by the user subject to the license agreement.

In accordance with further aspects of the disclosure, a method is disclosed acquiring an application to be presented at the user interface of the mobile device. This method includes the steps of: a) performing a context analysis by the mobile device to identify the application, b) determining by the mobile device that the application is not downloaded to the mobile device, c) downloading the application on the mobile device from an application provider, d) presenting an identifier of the application at a user interface of the mobile device, e) receiving a first input at the user interface requesting access to the application, f) presenting a license agreement at the user interface, the license agreement specifying a license fee, g) receiving a second input at the user interface indicating user acceptance of the license agreement and fee, and h) activating the application for access by the user subject to the license agreement.

This SUMMARY is provided to briefly identify some aspects of the present disclosure that are further described below in the DESCRIPTION. This SUMMARY is not intended to identify key or essential features of the present disclosure nor is it intended to limit the scope of any claims.

BRIEF DESCRIPTION OF THE DRAWING

A more complete understanding of the present disclosure may be realized by reference to the accompanying drawing in which:

FIG. 3 presents a flow diagram illustrating a method for pre-settlement of an application license fee in accordance with aspects of the present disclosure;

FIG. 4 presents a flow diagram illustrating a method for selecting applications based on a contextual analysis in accordance with aspects of the present disclosure; and FIG. 5 presents a flow diagram illustrating a method for settling an application license fee in accordance with aspects of the present disclosure.

DETAILED DESCRIPTION

Figure 1:
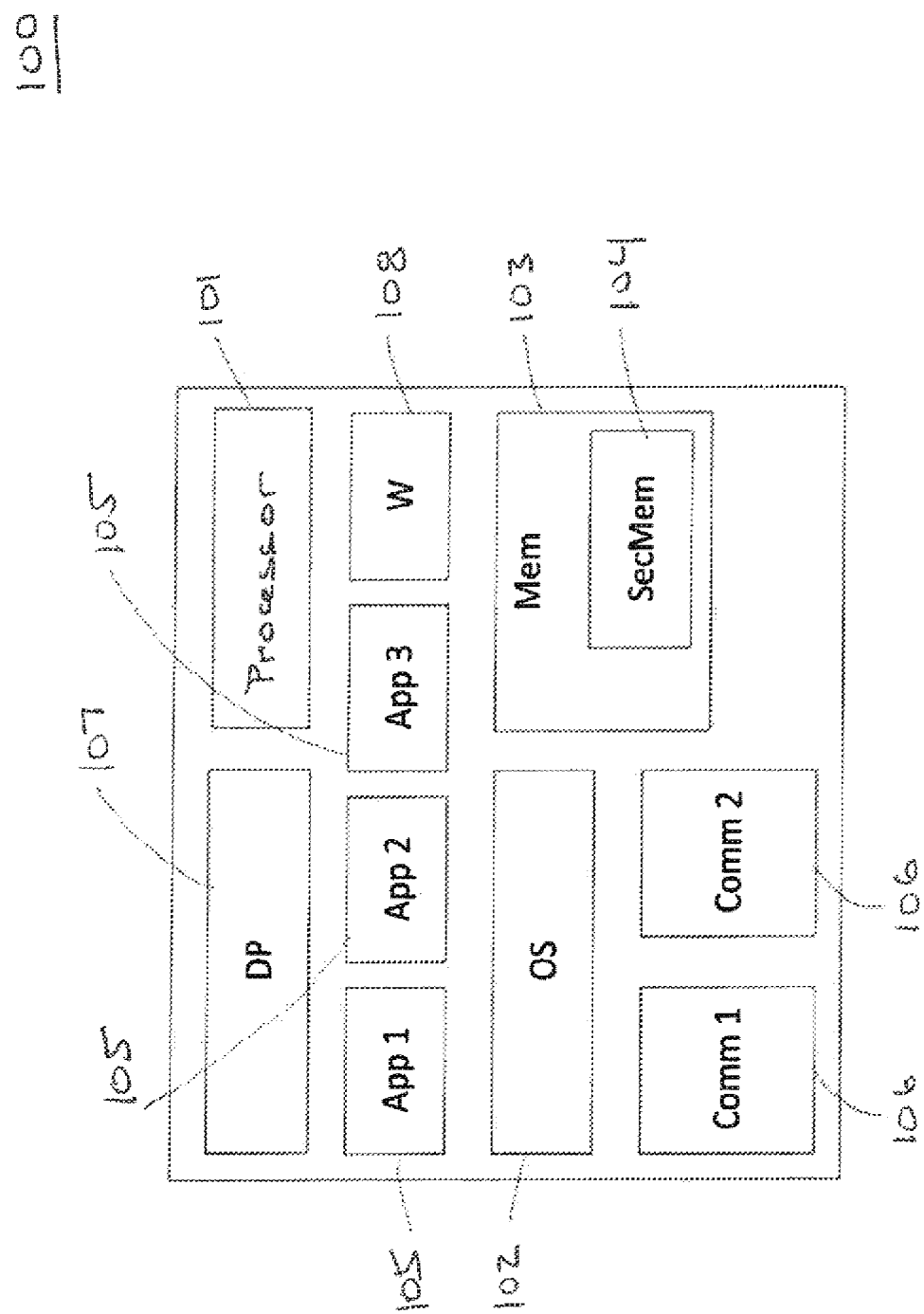
FIG. 1 presents a schematic diagram depicting mobile device for performing methods in accordance with aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements later developed that perform the same function, regardless of structure.

Unless otherwise explicitly specified herein, the drawings are not drawn to scale.

Aspects of the present disclosure are directed to methods for installing and activating applications on a mobile device (also termed a "User Equipment Device," or "UE device"). Such devices may, for example, include but are not limited to personal digital assistants (PDAs), smartphones, tablet devices, and other devices capable of executing software application programs that may have been pre-installed in a non-activated state on the device, or are dynamically installed, for example, in a non-activated state via a network connection to a system that offers applications and features for download and licensing, e.g., App Store, ("AS"). These software applications are programs stored in the UE device to be activated and then executed by a processor of the device when execution is triggered, that is when the application is started. In addition to these non-activated software applications, non-activated features or functions to be used with active apps may be stored on the UE device and activated for use. In this disclosure, for the sake of readability, both non-activated software features or functions and software applications are described by the single term "software applications."

In accordance with the present disclosure, the UE device is configured with an operating system, a wallet application, and other software applications. A local memory of the UE device stores license information for one or more of the installed apps that the UE device is currently licensed to use. For other installed applications, the license information may indicate that no license has yet been obtained for activating and executing the application.

The wallet application is an element of the mobile device that may preferably include execution hardware, software and a secure memory ("SecMem"). The wallet may manage one or more accounts on the mobile device, for which account information may be stored in the SecMem. The wallet accounts for purchases on each respective account, and is preferably able to calculate a total amount of purchases that is presently associated with each account. In one of the accounts which is designated a deferred payment account, a total fee amount accumulated in the account is calculated and compared to a pre-defined threshold amount that is stored in the account. This threshold may be fixed, or may be set by the user or another entity that can communicate with the UE device (for example, an online payment system ("PS") over a network ("NW")). The threshold may be set to zero, or to a non-zero amount. If the total amount exceeds the pre-defined threshold amount, a settlement of the total amount or a part thereof is initiated by the wallet application. The settlement process may include contacting the online PS via the NW, utilizing an online payment application on the mobile device or accepting a token for a prepaid amount that is provided via a user interface of the UE device (for example, a purchased QR-Code that is scanned via a camera application of the UE device).

When a software application is selected for execution on the UE device (for example, by touching an associated icon of the application on the touch screen of a smartphone), the UE device checks whether license information stored in the SecMem indicates availability of a current license for execution of the application. If a current license is not available, the user may be asked to execute a license agreement including an agreement to purchase either a temporary or permanent license at a fee. When the agreement is executed, the license information for the app is preferably updated and stored in the SecMem, and the software application is made active and available for execution. The license fee is accounted for in one of the accounts by the wallet application. If the total amount of purchases accumulated by the wallet application is below the pre-defined threshold amount for that account, no additional interaction is requested from the user. If the purchased license is limited in time, a time stamp and validity indicator may preferably be stored with the license information and included in the license check before execution of the application.

By executing an installed application immediately after agreement has been obtained from a user to pay an associated license fee and deferring payment of a fee, a user may more rapidly use a new software application without taking time to login into a payment system or otherwise type in associated credentials. As a result, users may be generally more willing to become engaged with new software applications in this less burdensome way. In addition, for applications that may have previously been installed on the UE device in a non-activated state and either not previously executed by a user or previously executed but with a presently expired license, a user can be able to select and execute the application even in the absence of having an immediate network connection to the AS or PS.

In accordance with additional aspects of the present disclosure, methods are disclosed for identifying, installing and suggesting execution of particular software applications by a UE device based on an analysis of a context associated with a use of the UE device. For example, based on the context analysis, the display of a UE device may highlight for user selection certain non-activated, pre-installed applications, or alternatively, certain non-activated, pre-installed features or functions that are available to be added to or used in conjunction with already active applications. As described above, once a highlighted non-activated, pre-installed application is selected by a user of the UE device, a license agreement including a license fee is preferably presented for a deferred settlement.

The context analysis may, for example, take into account time of day, day of week, the location of the UE device, any personal information of a user stored on the UE device, and/or any environmental information (for example, such as temperature, sunshine, rainfall, loudness, or certain features identifiable from camera views). The context analysis may also consider activities the user currently performs on his or her device (for example, web sites visited, media consumed, phone or video calls made, pictures or videos recorded, calendar entries and received mails or messages).

In an additional aspect of the disclosure, a non-activated, pre-installed application that is identified by the context analysis may be highlighted by being placed into a so-called "context menu" of the user interface. For example, user interfaces (UIs) often allow for objects on the UI in response to a secondary click or secondary tap to open a context menu that presents actions available with that object. Example entries in a context menu may include "print" for printable objects (for example, documents) and "share with . . . " (for example, for objects that can be transferred via e-mail, a social media service or the like). A context menu entry for a non-activated, pre-installed application may be marked to be unavailable (for example, colored, greyed, italic font or similarly distinguished) until the license agreement and license fee are accepted by the user of the UE device.

In another aspect of the disclosure, software applications that have not been previously downloaded to the UE device may nevertheless be identified as download targets by the UE device based on an analysis of the current user and UE context. According to this aspect, the UE device may for example have access to a list of applications which are available for download (for example, via the application store). The listing most preferably includes descriptions of each application's intended use and benefit. Based on the analysis of context for one or more of a current user and UE device, the UE device may proceed to select one or more software applications from the list that are not yet installed on the device and that appear to be potentially useful based on the current user and UE device context.

Once one or more applications have been selected by the UE device, the UE device may, for example, establish a network connection to request a download of the application from an offeror (for example, an AS). During the download, the offeror receives from the UE device the information that the download is being initiated by the device autonomously or otherwise such that the user will not be executing a license agreement concurrently at the time of the download, so that the offeror must authorize the download by accepting a deferral of the executed agreement and is associated license fees. Once downloaded to the device in a non-activated state, the user may preferably be notified that the downloaded application is available for activation. The notification may preferably identify the associated license fee, and offer the user an opportunity to agree to the license fee and activate the application. Alternatively, the notification may only include information about the nature of the application, and leave it to the user to proceed. In accordance with another aspect of the disclosure, the application may be identified to a user of the UE based on a context analysis of the UE and its use by the user.

In accordance with another aspect of the disclosure, payment of license fees for activated applications may occur when the wallet application of the UE device determines the total amount of purchases has exceeded the pre-defined threshold. For the settlement of the total purchases, the accumulated amount or a part thereof must be paid by the user to the vendor of the licenses. For that purpose, the mobile device connects to an online payment system via a network. The online payment system will typically require a user authentication, either by means of a login or another known way of authenticating the user (for example, via a biometric-based authentication). The wallet application on the UE will preferably provide the details of the purchases to the payment system. Once the details have been provided, the payment system may arrange for payment of the amount due from a payment source (for example, a pre-identified bank account or credit card of the user). Payment may be made to the payment system, the application store or any other third party that may participate in the payment function.

In accordance with aspects of the present disclosure, purchase details (including identification of the associated software applications that have been licensed) may preferably be provided by the payment system to each associated application store and stored for their records. This information may advantageously enable the licensed user to obtain authorization for using the application on additional devices without incurring additional license fees. In other words, while the user may be able to use a software application on one device by agreeing to a deferred license fee payment, that payment will need to be completed and settled with the application store in order for the application to be usable by the user on a different device (provided this feature in included in the license terms), because license information will need to be provided and available to the application store in order for the application store to authorize a transfer of the license between different devices.

In accordance with additional aspects of the present disclosure, an alternative for settling an account that has exceeded the threshold or otherwise requires settlement may be provided as follows. The UE device is provided with second account managed by the wallet application. This account may be administered as a prepaid account. A prepaid sum may be securely deposited and accounted for on the second account (for example, by means of a user-purchased QR-code token or a transaction number provided by a prepaid account service provider.

In one aspect of the present disclosure, the first account is maintained and used as a mechanism for accounting for small single license fees and other fees subject to deferred payment. When the total amount of license fees on the first account exceeds the threshold, the wallet application may check to determine whether the balance on the prepaid second account is high enough to settle the amount due on first account. In that case, the user may be offered the option to settle the amount directly and locally from the second prepaid account.

Also, in that case, information about the purchased licenses must be transmitted to one or more application stores that have supplied the purchased applications, for documentation and potential later use by the user on an alternate device. The UE device, after local settlement, generates the respective information for each application store and transmits the information at a point in time when a suitable network connection to the application store is available. If no suitable network connection is available, the settlement may be performed immediately on the UE device to allow use of the application, while the submission of the license information submission to the application store is delayed until a suitable network connection is available.

It should be noted that the first and second accounts described above with reference to the wallet application represent simply one example of a suitable account configuration, introduced for readability of this disclosure. This example is not intended to limit or restrict the scope of any of the claims. Many other account configurations are consistent with contemplated within scope of this disclosure. For example, the wallet application may alternatively be configured to operate on a single account that offers a deferred payment for license purchase and immediate prepaid and/or online payment for other purchases, including settlement of the deferred payments once the threshold is reached. It is further possible and within the scope contemplated by this disclosure to separate the management of different accounts for execution by multiple applications rather than by a single wallet application.

Although the specific examples provided by the disclosure all relate to the activation of executable user applications, it should be noted that the principles disclosed apply equally well, for example, to activating other electronic media content (including, for example, documents, video files and audio files). As in the case of software applications, this media content can for example be pre-installed on the UE device in a non-activated state, or autonomously downloaded as directed by a context analysis performed by the UE device.

We now turn to a further description, with reference to the drawing figures. FIG. 1 provides a schematic diagram that depicts a simplified UE device 100 comprising a processor 101 that is operated by means of an operating system (OS) 102. The OS 102 may operate one or more software applications 105 (App 1, App 2, App 3) that are installed in a non-activated state on the phone. These software applications may be pre-installed at the time of manufacturing the device, or later installed, for example, by downloading the applications to the UE 100 over a network from an application store. A user of the UE device 100 may manually download the applications via the UE device 100, or the applications may be autonomously downloaded by the UE device 100 in response to a contextual analysis of usage or environmental conditions for the UE device 100. The UE device 100 may further have a wallet application (W) 108 installed, which will be described further herein.

The UE device 100 as depicted in FIG. 1 further comprises a memory (Mem) 103 for data storage. A portion of the Mem 103 may be a specialized secure memory (Sec-Mem) 104 that is e.g. used by the wallet 108 to store associated personal and accounting information. The Sec-Mem 104 may ensure access to stored information only by authorized software and/or hardware parts of the UE device 100. The SecMem 104 may for example store all information in a secured way, e.g. encrypted with a key or key pair that is only available to the authorized parts of the mobile device 100. The SecMem 104 may also be tamper-resistant, i.e. resistant against physical attacks, attacks with unusual voltages or clock-signals and the like. The SecMem 104 may also be designed to zeroise the stored information once penetration of its security encapsulation is detected. The SecMem 104 as well as the memory 103 or parts thereof may be part of the UE device 100 itself, or alternatively, may be part of a peripheral connected to the device (for example, a peripheral such as SIM card, a smartcard, a flash drive and/or other external memory device that supports security features).

As shown in FIG. 1, the UE device 100 preferably includes one or more network interfaces 106 (Comm 1, Comm 2) for communicating with one or more external networks, for example including cellular mobile networks (GSM, UMTS, LTE, 5G, CDMA), wireless local area networks (WLAN), short range networks (BLUETOOTH, ZIGBEE) and/or near field communication networks. The UE device 100 also has a display (DP) 107 (for example, a touch screen display) to facilitate interaction with a user of the UE device 100, and to render a user interface generated by the OS 102.

Figure 2:
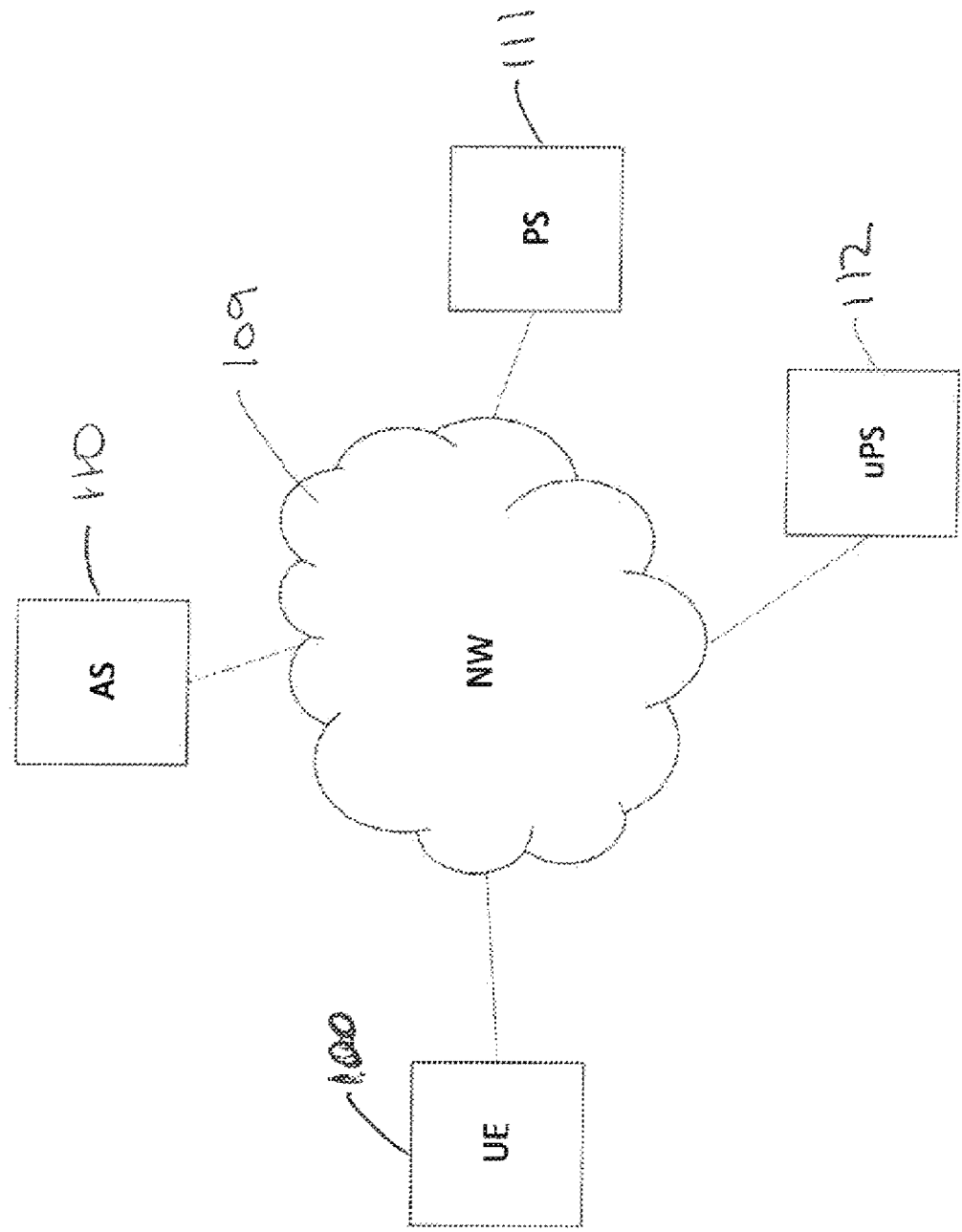
FIG. 2 presents a schematic diagram depicting a network and network elements accessible to the mobile device for performing methods in accordance with aspects of the present disclosure.

FIG. 2 presents a schematic diagram depicting a network (NW) 109 configured to interconnect several devices. These include at least one UE 100 as depicted in FIG. 1. In addition, the devices include at least one application store (AS) server 110 for downloading applications 105 to the UE device 100 via the network 109, and at least one payment system (PS) 111 that provides services for managing the settlement of an account managed by a wallet application 108 of the UE device 100. Further, the network 109 may preferably be connected to a user payment system (uPS) 112 that is an online payment system to which the user of the UE 100 is registered for electronically transferring sums in the amount of a payment owed. The user payment system 112 may for example be an online payment system offered by a credit card company or an online bank.

FIG. 3 presents a flow diagram illustrating the steps of a method 300 for pre-settlement of an application license fee for execution by the UE device 100 in accordance with aspects of the present disclosure. At step 301, an application 105 is selected to be activated and executed. The trigger for this may come, for example, when a user of the UE device 100 manually taps a respective icon on a home screen of the DP 107, or presented as a menu entry triggered by activating another icon or other action of the UE device 100. The trigger may also result without user intervention as the result of a particular context analysis that judged the triggered application might be of use or interest to the user.

At step 302, OS 102 of the UE 100 queries the memory 103 to determine whether license information about triggered application 105 is available. If so, at step 303, OS 102 determine whether a license to execute the application 105 is already available to the UE device 100. If such license information is available, the app is executed at step 304. If license information about the app is not available in the memory 103, or available license information indicates that no license for this application is in current effect, the user is notified at step 305 and requested to execute a license agreement, including an agreement to pay the license fee. This request preferably includes price (fee) information, and may also present multiple alternative license models with different associated fees for the use to select from. The selectable offers may, for example, include a one-time payment for an unlimited license, a one-time payment for license limited in time (for example, a license terminating after one month or one year) or a regular payment for periodic license terms (for example, subject to a recurring a monthly fee). If the user does not agree to pay for any of the offered license models at step 306, the application will not be activated and the procedure will end at step 307.

If agreement to pay a license fee is received from the user at step 306, the respective fee is accounted for on a respective account managed by the wallet application 108 depicted in FIG. 1. The wallet application 108 calculates the total amount of purchases not yet settled at step 308, and compares the amount with a pre-determined threshold at step 309. If the threshold is not reached or exceeded, the license is considered to be purchased and the license information is stored in the memory 103 at step 310 so that it is retrievable when the application is next triggered. The stored license information may for example include information about the term of the license, or about special provisions (for example, an agreement to license multiple software applications, or an agreement to certain usage restrictions for the UE device 100). While the license is active, the application 105 is active and may be executed by the user on the UE device 100 without login, password entry or the user providing any personal information.

Returning to step 309, if the total amount for license and other fees that has accrued in the associated account has reached or exceeds the pre-determined threshold, the wallet application 108 will preferably be administered by the OS 102 to request settlement of at least a portion of the total amount with a selected payment system at step 311. The selected payment system can for example be an online payment system (for example, user payment system 112 of FIG. 2) for a credit card online banking system or a usual bank account online banking system. Alternatively, the selected payment system can be a prepaid account on the phone which may be managed by the wallet application 108 as a second account that stores prepaid amounts for various payment purposes. When the account is settled successfully at step 312, the account is reset at step 313 by debiting the amount on the first deferred-pay account, and by storing associated license information at step 310 and executing the application 105 at step 304.

In summary, and as depicted in FIG. 3, the activation of an inactive software application 105 that is installed on UE device 100 is triggered according to the availability of a license for the application 105 on the UE device 100, and if no license is presently available, the application may be activated in exchange for an agreement by a user of the UE device 100 to pay the fee at a future time, subject to the status of a deferred fee account on the UE device 100. This may be accomplished entirely by the UE device 100, without the requirement to obtain authorization directly from an application store 110 before the user can activate and execute the application 105.

It should be noted that the steps described above with reference to FIG. 3 provide but a single example of a method for pre-settlement of an application license fee for execution by the UE device 100 in accordance with aspects of the present disclosure, so restricted for readability of this disclosure. This example is not intended to limit or restrict the scope of any of the claims. Many alternative variations to this example are possible and contemplated within the disclosure. For example, the step of checking for an existing license agreement could be conducted and controlled by the inactive application 105 rather than via the OS 102.

In another example, an application 105 in basic form may require no payment of a license fee for execution, but may require payment of a license fee to activate certain additional, optional features of the application. In this case, the determination of license availability and administration of the license agreement and fee may be most conveniently conducted by the application 105.

FIG. 4 presents a flow diagram illustrating a method for selecting applications based on a contextual analysis in accordance with aspects of the present disclosure. At step 401, the OS 102 or an associated software application of the UE device 100 may, for example, analyze a variety of parameters that may describe a current context for the user or the UE device 100. For example, a context may be determined from a location of the UE device 100, and/or from the current date and time. The context analysis is performed in order to identify useful software applications for the user who may otherwise never consider their selection and use.

For example, a city guide application may be pre-installed on the UE device 100, but remain unused by the user. At step 402, the UE device 100 determines that the application may be useful to the user (for example, by finding that the UE device is away from the user's city of residence or work, and near a place of interest that the city guide application has information about). At step 403, the UE device 100 determines the application to be already installed, and provides notice to the user via the display 107 of the UE device 100 at step 404 (for example, in a pop-up message) seeking a user response that requests the application to be activated and started (executed). If the user responds with a request to execute the application, the UE device 100 activates and executes the application at step 408. The user may alternatively fail to respond to the request or positively indicate that the application should not be started. In either case, the UE device 100 may return either immediately or after a predetermined period of time to analyze the current context at step 401.

Returning to step 403, if the UE device 100 determines that the application is not already installed, it may proceed at step 405 to determine whether a suitable computer or communications network 109 (for example, the Internet) is accessible to the UE device 100 for communicating, for example, with an application store 110 to initiate downloading of the application to the UE device 100. If the network 109 is available and the application store 110 is accessible, the UE device 100 with appropriate device and/or user permissions may proceed autonomously at step 406 to download the application to the UE device 100 without any user intervention. Once downloaded, the UE device 100 may proceed at step 404 to provide notice to the user via the display 107 of the UE device 100.

As another contextual analysis example, an email application on the UE device 100 may be configured to receive user emails in the background, for example, when the email application is not being used by a user. In this case, the UE device 100 may be configured to perform the context analysis based on analyze content of received emails in addition to time and location. For example, the UE device may determine that one of the emails includes a link to a video in a specific video encoding format. The context analyzing entity may identify a video application that could be available to the user for opening the link referenced in the email in the specific format, after determining that no other application installed on the UE device 100 allows the video to be viewed in the specific format.

In this case, and in accordance with the steps described in relation to FIG. 4, the UE device 100 initiates an autonomous download of the identified application. The UE device 100 may, for example, in this case, wait until a particularly suitable network connection (for example, a no-cost or low-cost WLAN connection such as a WiFi connection) is available for the autonomous download, and perform the download at limited or no cost to be charged to the UE device 100. In the request made to download the application from the application store (AS) 110, the UE device 100 may indicate that the download request is autonomous (without user participation). In this case, the download request is made without the user concurrently executing an application license, and is conditioned on the user's pre-agreement to later execute the license (and typically pay a license fee) at or after a time of initial use. Alternatively, and as described for example above with reference to FIG. 3, the license fee may be paid from a prepaid account on the UE device 100 as managed by the wallet application 108.

FIG. 5 presents a flow diagram illustrating a method for settling an application license fee in accordance with aspects of the present disclosure. At step 501, when the UE device 100 determines an application to be useful and determines that the application is not installed on the device (as described, for example, above with reference to FIG. 4), the UE device 100 at step 502 transmits a "Request Download w/o license" message to the Application Store 110. This message may, for example, contain an identifier of the application to be downloaded, a device ID for identifying a device specific account, and/or a user ID for identifying a user account. The device ID, for example, for a UE device 100 that is a mobile phone may preferably indicate a MAC address for the mobile phone.

The application store 110, upon receiving the request message, determines from the message type or another indication provided in the message that it is permitted to transmit the respective software application to the UE device 100 and trust that the application will not be executed by a used before a license has been purchased either directly at the time of first use or later as a deferred payment as described for example with reference to FIG. 3. Accordingly, the application store 110 transmits the software application to the UE device 100 at step 503.

After a successful download of the application software to the UE device 100, the user may be notified about the downloaded application (for example, as the result of a contextual analysis as described with reference to FIG. 4) at step 504, and preferably notified as well about the potential benefit to the user of the downloaded application in the identified context. Further at step 504, the UE device 100 is requests that the user accept the terms of an associated license for the application, including agreement to pay a licensing fee. At step 505, the US device 100 preferably stores license information in the secure memory 104 of FIG. 1, together with license payment information to be managed by the wallet application 108.

For the case when the user agrees to make a deferred payment of the licensing fee, payment is preferably deferred until a time at step 506 when the UE device 100 determines that a currently-accumulated total in a deferred payment account of the UE device 100 has exceeded a threshold. Thereafter, at step 507, the wallet application 108 of the UE device 100 may preferably transmit a request for settlement to a payment system 111 over a data or communications network (for example, over the Internet). Together with or subsequent to the settlement request made at step 507, the UE device 100 transmits purchase information for the deferred payment account stored in secure memory 104 to the payment system 111 over a suitable data or communications network 109 (for example, the Internet). A user account of payment system 111 in this description is meant to be the logical peer of the wallet application 108 for settling the deferred payment account only when the threshold is reached. The payment system 111 may, for example, comprise the LaterPay payment service provided by LaterPay GMBH of Munich, Germany. At step 508, settlement is achieved between the user account of the wallet application 108 and the user account of the payment system 111.

In the event that payment is not facilitated by the wallet application 108, an online user payment system 112 (for example, including one or more of a credit card company server, bank server and/or an electronic payment service such as PAYPAL) may be required to act as a peer of a user account of the payment system, independent of the wallet application 108 of UE device 100. In this case, the user payment system 112 transfers money from a user account of the user payment system 112 to the user account of the payment system 111, and thereby logically to an account of the wallet application 108. At step 509, the payment system confirms the settlement with the wallet application 108, which preferably records the settlement in the SecMem 104 of the UE device 100 and resets the deferred payment account of the wallet application 108 at step 510. As step 511, the payment system 111 provides a payment to the application store 110, which may represent the license fee reduced by a service fee collected by the payment system 111. Preferably, the payment system 111 further provides the application store 110 with identification information for the UE device 100 and/or an associated user to be stored by the application store 110 so that for the future the license can be re-used by the user after a device change or by the UE device 100 after a reset of the device with loss of license information from the secure memory 104.

REFERENCE CHARACTER TABLE

The following table lists the reference characters and names of features and elements used herein:

| | Feature or element |
|---|---|
| 100 | User Equipment Device (UE) |
| 101 | Processor |
| 102 | Operating System (OS) |
| 103 | Memory (Mem) |
| 104 | Secure Memory (SecMem) |
| 105 | Software Applications (App1, App2, App3) |
| 106 | Network Interfaces (Comm 1, Comm 2) |
| 107 | Display (DP) |
| 108 | Wallet Application (W) |
| 109 | Network (NW) |
| 110 | Application (App) Store (AS) |
| 111 | Payment System (PS) |
| 112 | User Payment System (uPS) |

It will be understood that, while various aspects of the present disclosure have been illustrated and described by way of example, the invention claimed herein is not limited thereto, but may be otherwise variously embodied within the scope of the following claims. For example, it should be understood that while the condition determine by the UE device 100 for identifying a new software application 105 to a user has been described as a condition recognized from a context analysis performed by the UE device 100, the condition could alternatively relate to a variety of other indicators, for example, receipt of a request from an application store or a social networking partner of a user of the UE device 100 to present the application to the use at a user interface of the UE device 100.

We claim:

1. A computer-implemented method for activating a software application on a mobile device of a user in the absence of a network connection facilitating communications between the mobile device and a provider of the application, wherein activation of the software application is conditioned on a pre-settlement action, the method comprising the steps of:
   a) determining by the mobile device whether a condition has been satisfied as a result of performing a first context analysis;
   b) identifying the application by the mobile device as a function of the first context analysis,
   c) transmitting a download request message over a data network by the mobile device to an application server, wherein the request message includes an indicator indicating that the download is being requested with a deferral of a concurrent execution of an application license agreement by the application server;
   d) downloading the application over the data network by the mobile device without concurrent execution of an application license agreement;
   e) storing the downloaded application in a non-activated form in a memory of the mobile device;
   f) performing a second context analysis by the mobile device while the mobile device is disconnected from the data network to select the downloaded application stored in the memory of the mobile device;
   g) presenting an identifier of the downloaded application at a user interface of the mobile device while the mobile device is disconnected from the data network;
   h) receiving a first input at the user interface of the mobile device requesting access to the downloaded application;
   i) presenting a license agreement for the downloaded application at the user interface of the mobile device while the mobile device while the mobile device is disconnected from the data network, the license agreement specifying a license fee;

j) receiving a second input at the user interface of the mobile device indicating user execution of the license agreement and user acceptance to pay the license fee;

k) executing a pre-settlement action by the mobile device with reference to the license agreement and the license fee while the mobile device is disconnected from the data network; and l) activating the application for access by the user by the mobile device, subject to the license agreement, while the mobile device is disconnected from the data network, wherein the step of executing the pre-settlement action by the mobile device comprises the steps of:
  i) receiving a third input at the user interface indicating a selection that the license fee shall be settled using a deferred payment account of a payment system accessed by a wallet application maintained in mobile device, the deferred payment account having a predetermined threshold amount qualifying for deferred payment by the payment system;
  ii) storing information of the executed license agreement in a secure memory of the mobile device; and
  iii) recording the license fee in a ledger entry for the deferred payment account of the payment system in a secure memory of the mobile device;
  iv) calculating a total amount accumulated in the deferred payment account; and
  v) determining that the total amount accumulated in the deferred payment account is less than the predetermined threshold amount qualifying for deferred payment by the payment system.

2. The computer-implemented method of claim 1, wherein the first context analysis is based on user actions performed on the mobile device.

3. The computer-implemented method of claim 2, wherein the user actions performed are selected from the group consisting of applications opened, web sites visited, and media accessed.

4. The computer-implemented method of claim 1, wherein the first context analysis is based on content of received or transmitted electronic messages.

5. The computer-implemented method of claim 4, wherein electronic messages are messages selected from the group consisting of e-mail, instant messaging, Internet chat, SMS or text messaging, voice mail, and facsimile mail.

6. The computer-implemented method of claim 1, wherein the first context analysis is based on environmental factors.

7. The computer-implemented method of claim 6, wherein the environmental factors are selected from the group consisting of temperature, weather conditions, noise, and images captured by a camera application of the mobile device.

8. The computer-implemented method of claim 1, wherein the first context analysis is based on temporal factors of the mobile device.

9. The computer-implemented method of claim 8, wherein the temporal factors are selected from the group consisting of year, month, day of week, time of day, and calendar information accessible via the network or maintained on the mobile device.

10. The computer-implemented method of claim 1, wherein the step of executing the pre-settlement action by the mobile device further comprises the steps of:
  determining that the calculated total amount accumulated in the deferred payment account is greater than the predetermined threshold amount qualifying for deferred payment by the payment system;
  establishing a network connection facilitating communications between the mobile device and the application server after the application has been activated;
  transmitting a settlement request for the license fee over a network to a payment system by the mobile device, the settlement request including license agreement information;
  receiving an authorization notification from the payment system over the network; and
  recording the settlement in the ledger of the account for the payment system, whereby the total amount accumulated is reduced by an amount of the settlement.

11. The computer-implemented method of claim 10, further comprising the step of:
  providing confirmation of the settlement payment and license agreement information to the application server by the payment system.

12. The computer-implemented method of claim 1, wherein the license agreement provides a plurality of license conditions or terms as options for user selection, and the license agreement information indicates at least one of the options is selected.

13. The computer-implemented method of claim 12, wherein the plurality of license conditions or terms as options include at least one of a license fee applicable only to selected features or a selected version of the application, a time-limited license option or a usage-limited license option.

14. The computer-implemented method of claim 1, wherein the downloading step comprises the steps of:
  configuring the mobile device for receiving the download for the application from the application server; and
  receiving the application by the mobile device.

15. The computer-implemented method of claim 14, wherein the transmitting step further comprises the step of:
  providing the indicator to indicate that the download is being requested with a deferral of concurrent payment of application license fees.

16. The computer-implemented method of claim 1, wherein at least one of the first context analysis or the second context analysis is based on actions performed on the mobile device.

17. The computer-implemented method of claim 16, wherein the user actions performed are selected from the group consisting of applications opened, web sites visited, and media accessed.

18. The computer-implemented method of claim 1, wherein at least one of the first context analysis or the second context analysis is based on content of received or transmitted electronic messages.

19. The computer-implemented method of claim 18, wherein electronic messages are messages selected from the group consisting of e-mail, instant messaging, Internet chat, SMS or text messaging, voice mail, and facsimile mail.

20. The computer-implemented method of claim 1, wherein at least one of the first context analysis or the second context analysis is based on environmental factors.

21. The computer-implemented method of claim 20, wherein the environmental factors are selected from the group consisting of temperature, weather conditions, noise, and images captured by a camera application of the mobile device.

22. The computer-implemented method of claim 1, wherein at least one of the first context analysis or the second context analysis is based on temporal factors of the mobile device.

23. The computer-implemented method of claim 22, wherein the temporal factors are selected from the group consisting of year, month, day of week, time of day, and calendar information accessible via the network or maintained on the mobile device.

24. The computer-implemented method of claim 1, wherein the step of executing the pre-settlement action by the mobile device comprises the steps of:
   iv) calculating a total amount accumulated in the deferred payment account;
   v) determining that the license fee is greater than the predetermined threshold amount qualifying for deferred payment by the payment system;
   vi) determining whether an amount in a prepaid account maintained by the wallet application is sufficient to settle the total the total amount accumulated in the deferred payment account; and
   vii) receiving a fourth input at the user interface indicating that the total amount accumulated in the deferred payment account should be paid using the prepaid account when it is determined that the amount maintained in the prepaid account is sufficient to settle the total amount accumulated in the deferred payment account.

25. The computer-implemented method of claim 24 further comprising the step of:
   recording the settlement in the ledger of the deferred payment account for the payment system, whereby the total amount accumulated is reduced by an amount of the settlement paid from the prepaid account, and recording the settlement in the prepaid account, whereby the amount maintained in the prepaid account is reduced by the settlement amount paid.

26. The computer-implemented method of claim 1, wherein the step of executing the pre-settlement action by the mobile device further comprises the steps of:
   iv) calculating a total amount accumulated in the deferred payment account; and
   v) determining that the total amount accumulated in the deferred payment account is less than the predetermined threshold amount qualifying for deferred payment by the payment system.

* * * * *